(12) United States Patent
Shao et al.

(10) Patent No.: US 11,256,146 B2
(45) Date of Patent: Feb. 22, 2022

(54) ELECTRODE STRUCTURE, ARRAY SUBSTRATE AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Xibin Shao, Beijing (CN); Yingying Qu, Beijing (CN); Zhihua Sun, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/034,063

(22) Filed: Sep. 28, 2020

(65) Prior Publication Data
US 2021/0132449 A1    May 6, 2021

(30) Foreign Application Priority Data
Oct. 30, 2019    (CN) .......................... 201911043875.9

(51) Int. Cl.
*G02F 1/1343* (2006.01)
*G02F 1/1362* (2006.01)

(52) U.S. Cl.
CPC ...... *G02F 1/134309* (2013.01); *G02F 1/1362* (2013.01)

(58) Field of Classification Search
None
See application file for complete search history.

(56) References Cited

U.S. PATENT DOCUMENTS

| 9,746,713 | B2 * | 8/2017 | Yoso | ................. | G02F 1/134309 |
| 2005/0179844 | A1 * | 8/2005 | Roosendaal | ...... | G02F 1/134309 |
| | | | | | 349/139 |

(Continued)

FOREIGN PATENT DOCUMENTS

| CN | 103969897 A | 8/2014 |
| CN | 203825339 U | 9/2014 |

(Continued)

OTHER PUBLICATIONS

First Office Action for CN Patent Application No. 201911043875.9 dated Sep. 3, 2021.

*Primary Examiner* — Ryan Crockett
(74) *Attorney, Agent, or Firm* — Thomas | Horstemeyer, LLP (57) ABSTRACT

The application relates to an electrode structure, an array substrate and a display device. The electrode structure has hollow portions, and electrode portions formed between adjacent hollow portions; the hollow portions have first and second hollow holes; projection planes of the first and second hollow holes in the first direction are completely overlapped; the electrode portions comprise: first electrode blocks located between the first hollow holes and second electrode blocks located between the second hollow holes; a sum of widths of each first hollow hole and the first electrode block adjacent to it in the first direction is different from a sum of widths of each second hollow hole and the second electrode block adjacent to it in the first direction; the width is a dimension in the first direction. In this solution, process fluctuations can be reduced and light transmittance can be improved.

13 Claims, 4 Drawing Sheets

(56) References Cited

U.S. PATENT DOCUMENTS

| | | | |
|---|---|---|---|
| 2006/0274241 A1* | 12/2006 | Maeda | G02F 1/1336 349/114 |
| 2011/0043715 A1* | 2/2011 | Ohyama | H04N 13/315 349/15 |
| 2012/0013606 A1* | 1/2012 | Tsai | G02B 30/00 345/419 |
| 2013/0100388 A1* | 4/2013 | Matsushima | G02F 1/134363 349/123 |
| 2013/0257700 A1* | 10/2013 | Chang | G02F 1/134363 345/87 |
| 2014/0092353 A1* | 4/2014 | Matsushima | G02F 1/133707 349/110 |
| 2014/0160412 A1* | 6/2014 | Peng | G02F 1/134363 349/123 |
| 2015/0234245 A1* | 8/2015 | Ito | G02F 1/134363 349/143 |
| 2017/0205655 A1* | 7/2017 | Li | H01L 27/1248 |
| 2017/0269448 A1 | 9/2017 | Chen et al. | |
| 2018/0101072 A1* | 4/2018 | Lazo | G02F 1/133707 |
| 2021/0018778 A1* | 1/2021 | Matsushima | G02F 1/133512 |
| 2021/0132449 A1* | 5/2021 | Shao | G02F 1/134309 |

FOREIGN PATENT DOCUMENTS

| | | |
|---|---|---|
| CN | 105867031 A | 8/2016 |
| CN | 106129065 A | 11/2016 |
| CN | 107123745 A | 9/2017 |
| CN | 107817922 A | 3/2018 |
| CN | 109283754 A | 1/2019 |
| CN | 110275357 A | 9/2019 |

* cited by examiner

*(PRIOR ART)*

ELECTRODE STRUCTURE, ARRAY SUBSTRATE AND DISPLAY DEVICE

CROSS REFERENCE TO RELATED APPLICATION

This application is based upon and claims priority to Chinese Patent Application No. 201911043875.9, entitled ELECTRODE STRUCTURE, ARRAY SUBSTRATE AND DISPLAY DEVICE, filed on Oct. 30, 2019, where the entire contents thereof are incorporated herein by reference.

TECHNICAL FIELD

This application relates to a field of display technology and, more specifically, to an electrode structure, an array substrate, and a display device.

BACKGROUND

A Thin Film Transistor Liquid Crystal Display (TFT-LCD) device has the characteristics of small size, low power consumption, and no radiation, and has been rapidly developed in recent years. The display principle of the thin film transistor liquid crystal display device is that an electric field is formed between a pixel electrode and a common electrode, and the electric field drives a deflection of the liquid crystal molecules to realize the bright and dark display of the image. That is to say, electrode structures, such as the pixel electrode and the common electrode, will affect light transmittance of the thin film transistor liquid crystal display device.

It should be noted that the information disclosed in the background art section above is only used to strengthen the understanding of the background of the application, and therefore may include information that does not constitute the prior art known to those of ordinary skill in the art.

SUMMARY

An aspect of this application is to provide an electrode structure, an array substrate, and a display device, which can improve the light transmittance of the display product while ensuring the process capability.

A first aspect of the present application provides an electrode structure, where the electrode structure has a plurality of hollow portions arranged at intervals in a first direction, and electrode portions are formed between adjacent hollow portions;

each of the hollow portions has at least a plurality of first hollow holes and a plurality of second hollow holes, and adjacent first hollow holes in each hollow portion are connected by the second hollow holes; projection planes of the first hollow holes in the first direction, which are adjacent and parallel to each other in the first direction, are completely overlapped; and projection planes of the second hollow holes in the first direction, which are adjacent and parallel to each other in the first direction, are completely overlapped;

each of the electrode portions comprises at least a first electrode block and a second electrode block, wherein the first electrode block is located between the first hollow holes that are adjacent and parallel to each other in the first direction, and the second electrode block is located between the second hollow holes that are adjacent and parallel to each other in the first direction;

a sum of a width of each first hollow hole and a width of the first electrode block adjacent to the first hollow hole in the first direction is different from a sum of a width of each second hollow hole and a width of the second electrode block adjacent to the second hollow hole in the first direction;

wherein the width is a dimension in the first direction.

In an exemplary embodiment of the application, the width of the first hollow hole and the width of the second hollow hole in each of the hollow portions are different; and the width of the first electrode block and the width of the second electrode block in each of the electrode portions are the same.

In an exemplary embodiment of the application, the width of the first hollow hole of one of the adjacent hollow portions is equal to the width of the second hollow hole of the other of the adjacent hollow portions; the width of the second hollow hole of one of the adjacent hollow portions is equal to the width of the first hollow hole of the other of the adjacent hollow portions.

In an exemplary embodiment of the application, the width of the first hollow hole and the width of the second hollow hole in each of the hollow portions the same; and the width of the first electrode block and the width of the second electrode block are different.

In an exemplary embodiment of the application, the width of the first electrode block of one of the adjacent electrode portions is equal to the width of the second electrode block of the other of the adjacent electrode portions; the width of the second electrode block of one of the adjacent electrode portions is equal to the width of the first electrode block of the other of the adjacent electrode portions.

In an exemplary embodiment of the application, in each of the hollow portions, the width of the first hollow hole is greater than the width of the second hollow hole;

in each of the electrode portions, the width of the first electrode block is greater than the width of the second electrode block.

In an exemplary embodiment of the application, the hollow portions comprise a first hollow section and a second hollow section, and each of the first hollow section and the second hollow section comprises the first hollow hole and the second hollow hole;

both the first hollow hole and the second hollow hole in the first hollow section extend in a second direction; and both the first hollow hole and the second hollow hole in the second hollow section extend in a third direction;

wherein the first hollow hole of one of the first hollow section and the second hollow section is connected to the second hollow hole of the other of the first hollow section and the second hollow section, and the first direction, the second direction and the third direction intersect in pairs.

In an exemplary embodiment of the application, an angle between the second direction and the third direction is a right angle or an obtuse angle; and an angle between the second direction and the first direction equals to an angle between the third direction and the first direction.

In an exemplary embodiment of the application, a sum of the width of each first hollow hole and the width of the first electrode block adjacent to the first hollow hole and a sum of the width of each second hollow hole and the width of the second electrode block adjacent to the second hollow hole is 5 µm to 10 µm.

A second aspect of the present application provides an array substrate, which includes: a base substrate and sub-pixel units distributed on the base substrate in an array, each of the sub-pixel units comprising a common electrode and a pixel electrode insulated from each other, at least one of the common electrode and the pixel electrode is the electrode structure mentioned above.

A third aspect of the present application provides a display device which includes the array substrate mentioned above.

It should be understood that the above general description and the following detailed description are only exemplary and explanatory, and cannot limit the application.

BRIEF DESCRIPTION OF THE DRAWINGS

The drawings here are incorporated into the specification and constitute a part of the specification, show embodiments that conform to the application, and are used together with the specification to explain the principle of the application. Understandably, the drawings in the following description are only some embodiments of the present application. For those of ordinary skill in the art, other drawings can be obtained based on these drawings without creative work.

DETAILED DESCRIPTION

Example embodiments will now be described more fully with reference to the accompanying drawings. However, the example embodiments can be implemented in various forms, and should not be construed as being limited to the embodiments set forth herein; on the contrary, these embodiments are provided so that this application will be comprehensive and complete, and fully convey the concept of the example embodiments to those skilled in the art. The same reference numerals in the figures represent the same or similar structures, and thus their detailed descriptions will be omitted.

Although relative terms such as "upper" and "lower" are used in this specification to describe the relative relationship of one component of an icon to another, these terms are used in this specification only for convenience, for example, the direction of the example described according to the drawings. It can be understood that if the device of the icon is turned over and turned upside down, the component described as "upper" will become the "lower" component. When a structure is "on" another structure, it may mean that a certain structure is integrally formed on another structure, or that a certain structure is "directly" arranged on another structure, or that a certain structure is "indirectly" arranged on another structure through yet another structure.

The terms "a", "an", "the", "said", and "at least one", are used to express the presence of one or more the element, component, or the like. The terms "comprise", "include" and "have" are intended to be inclusive, and mean there may be additional elements, components, or the like other than the listed elements, components, or the like. The terms "first" and "second" are used only as markers, and are not numerical restriction to the objects.

Figure 1:
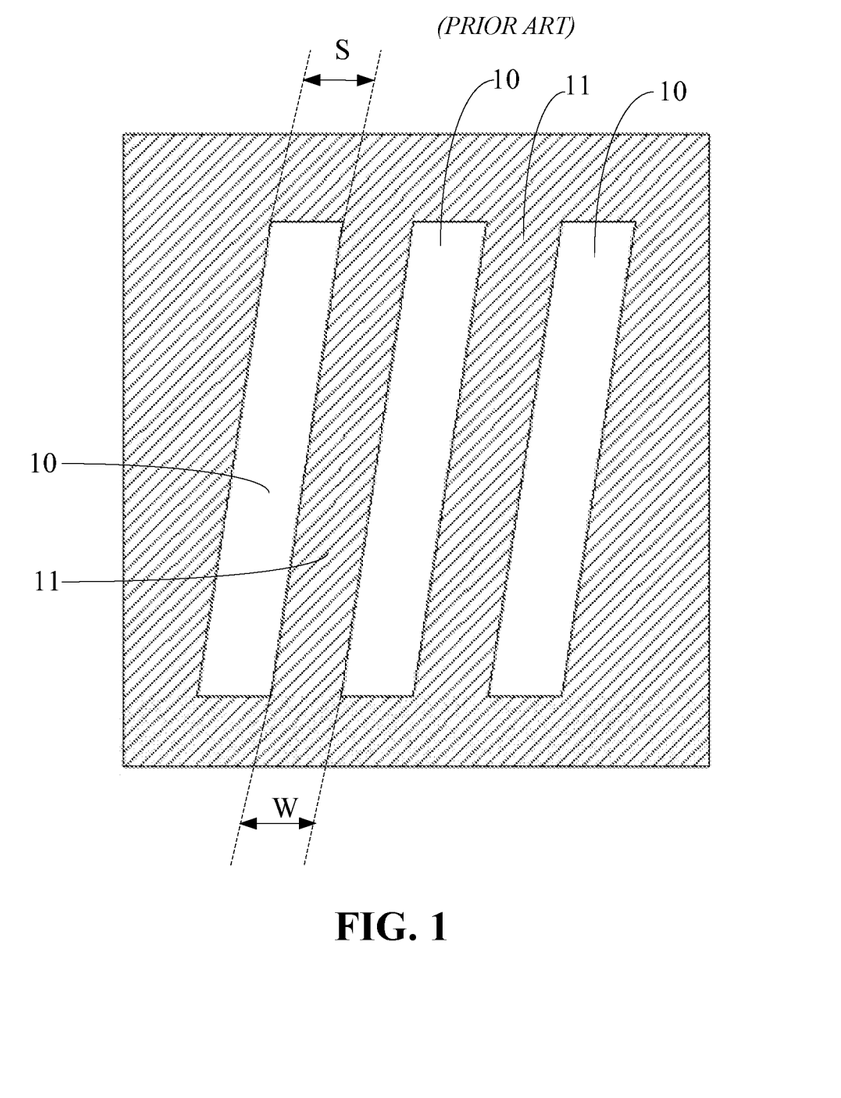
FIG. 1 shows a schematic diagram of the electrode structure in the related art.

In the related art, the pixel electrode and/or the common electrode in the liquid crystal display device are usually fabricated as a slit electrode structure. As shown in FIG. 1, the slit electrode structure may include a plurality of slits 10, between adjacent slits. The electrode portion 11 is formed, where the width S of the slit 10 is equal everywhere, and the width W of the electrode strip 11 is equal everywhere, so that the pitch of each pixel in the slit electrode structure is the same, and the pixel pitch is the width S of the slit and the sum of the width W of the adjacent electrode portion.

Studies have shown that the size of the pixel pitch affects the light transmittance Tr of liquid crystal display products, and the process fluctuations of different pixel pitches are different. Table 1 below shows the simulation results of different pixel pitches:

TABLE 1

| W/S | process fluctuation (normalized result) | | | | | | | |
|---|---|---|---|---|---|---|---|---|
| | ±0.1 (μm) | | ±0.2 (μm) | | ±0.4 (μm) | | ±0.6 (μm) | |
| (μm) | Tr (%) | Δ (%) | Tr (%) | Δ (%) | Tr (%) | Δ (%) | Tr (%) | Δ (%) |
| 2.6/5.1 | 29.24 | 0.29 | 29.24 | 0.63 | 29.24 | 1.33 | 29.24 | 2.46 |
| 1.8/3.7 | 30.39 | 1.09 | 30.39 | 2.27 | 30.39 | 4.29 | 30.39 | 6.63 |

As shown in Table 1, when the electrode strip width W is 2.6 μm and the slit width S is 5.1 μm, that is, when the pixel pitch is 7.7 μm, the light transmittance Tr of the liquid crystal display device using the electrode structure may be about 29.24%. When the electrode strip width W is 1.8 μm and the slit width S may be 3.7 μm, that is, when the pixel pitch is 5.5 μm, the light transmittance Tr of the liquid crystal display device using the electrode structure may be about 30.39%. That is to say, the light transmittance of the liquid crystal display device may be increased by reducing the pixel pitch, so that the electrode structure may be applied to large-size, high-resolution liquid crystal display products.

However, as shown in Table 1, the smaller the pixel pitch, the greater the transmittance difference A. Taking the process dimension tolerance of ±0.1 μm as an example, when the pixel pitch is 7.7 μm, the transmittance difference A is 0.29%. When the pixel pitch is 5.5 μm, the transmittance difference A is 1.09%. The larger the transmittance difference A, the more serious the Mura (uneven brightness, causing various traces) phenomenon, that is, if the pixel pitch is smaller, it will cause the Mura phenomenon of the display product more serious. In other words, as the pixel pitch decreases, the process fluctuation increases, and the defective rate of manufactured products is higher, which is likely to cause poor image quality.

In addition, it may be seen from Table 1 that the process dimensional tolerance has a greater impact on the transmittance difference A, that is, as the process dimensional tolerance increases, the transmittance difference A increases.

From the above content, it may be seen that if the pixel pitch is designed to be larger overall, the light transmittance will be reduced, which cannot meet the requirements of large-size and high-resolution liquid crystal display products; if the pixel pitch is designed to be smaller, it will produce greater process fluctuations, which will increase the defective rate of manufactured products.

Based on the foregoing problems, an embodiment of the present application provides an electrode structure, which may be applied to a liquid crystal display product, and specifically may be a pixel electrode and/or a common electrode in a liquid crystal display product.

Figure 2:
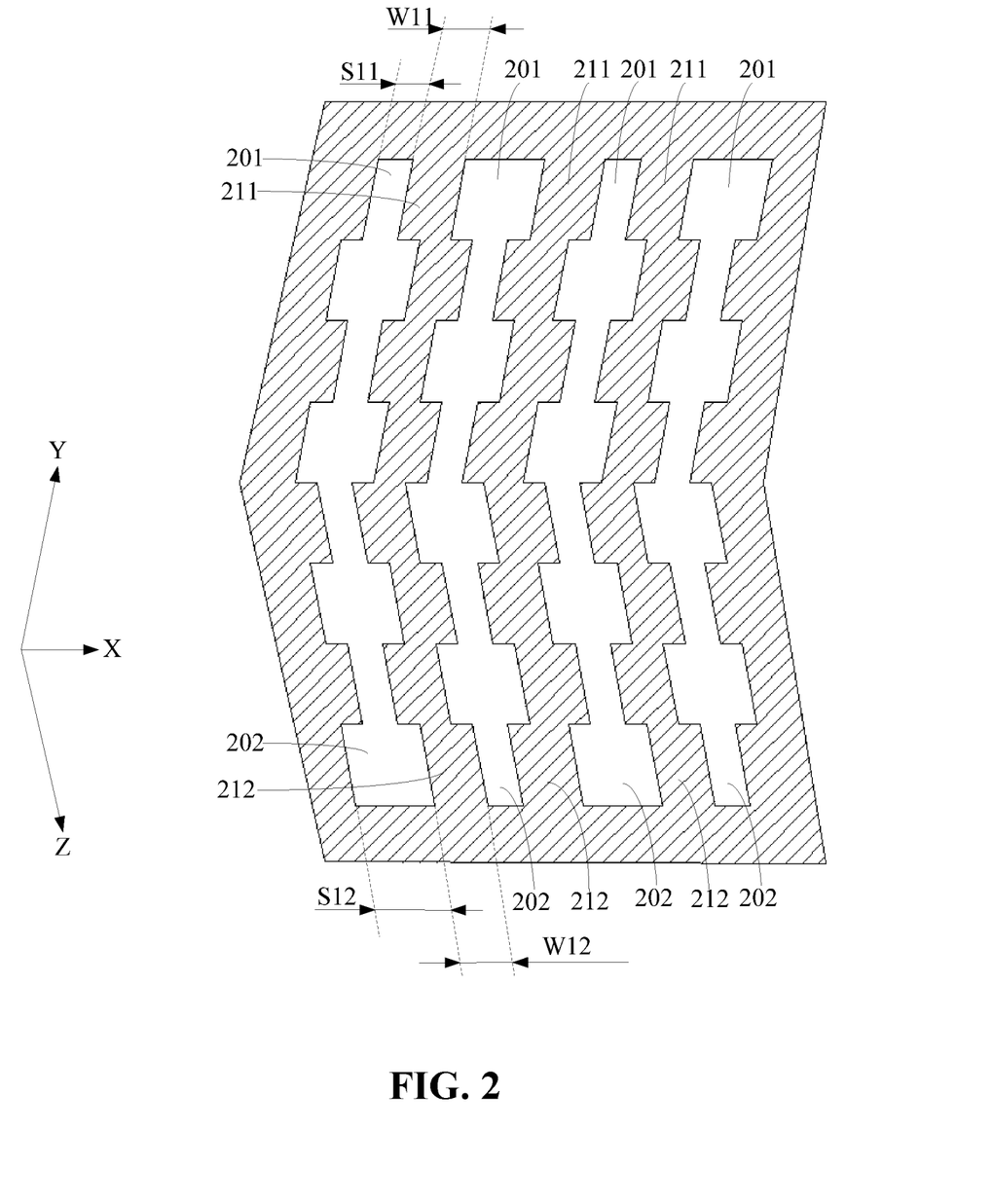
FIG. 2 shows a schematic diagram of the electrode structure according to an embodiment of the present application.
Figure 3:
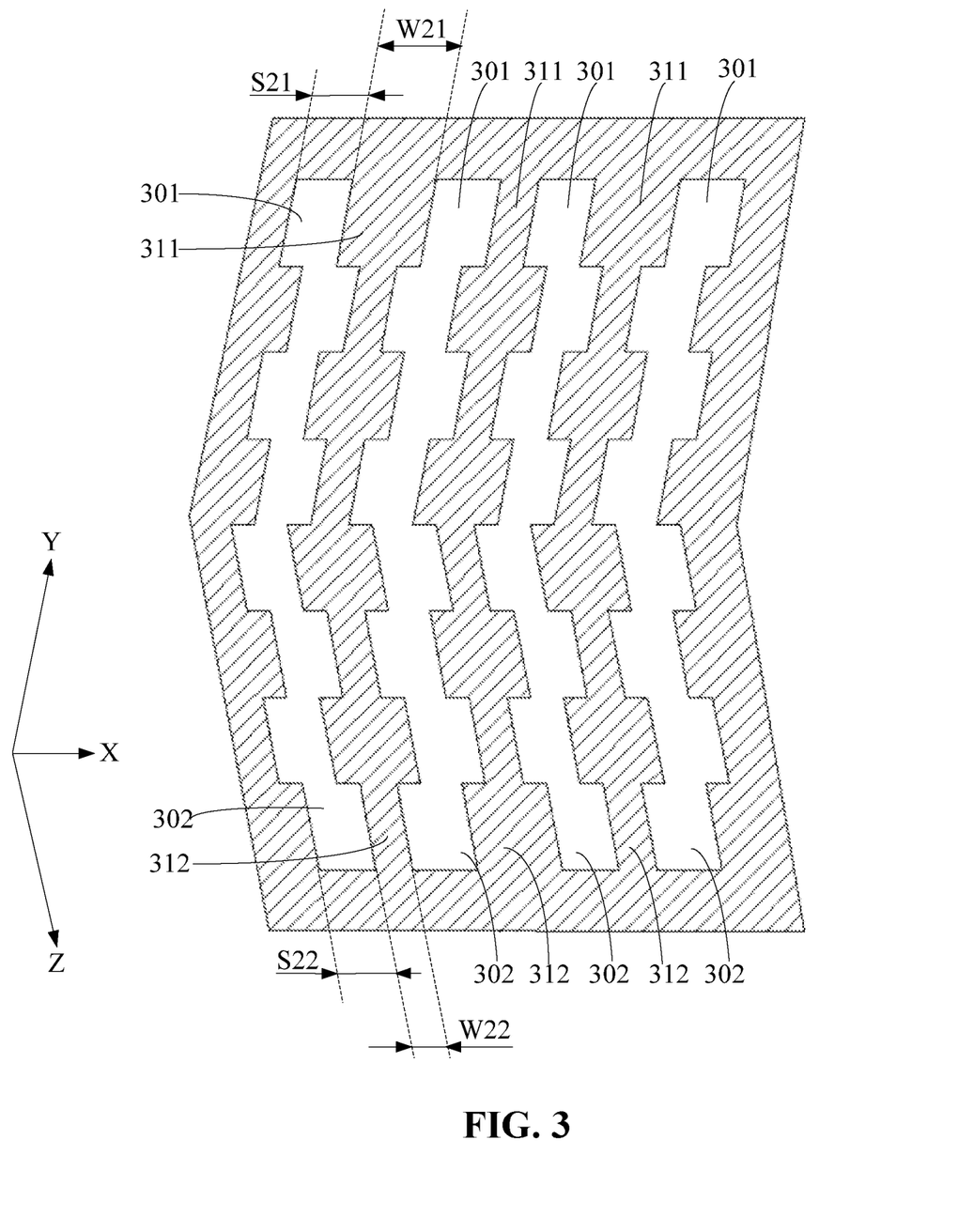
FIG. 3 shows a schematic diagram of an electrode structure according to another embodiment of the present application.
Figure 4:
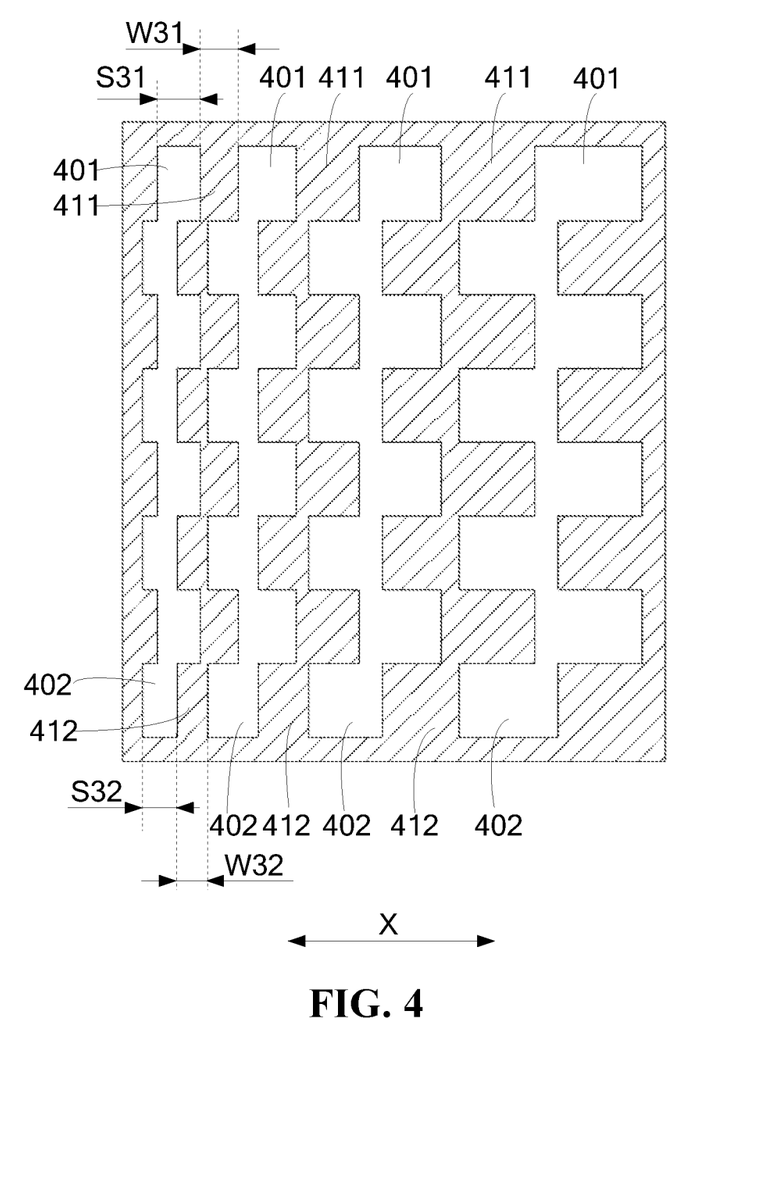
FIG. 4 shows a schematic diagram of an electrode structure according to yet another embodiment of the present application.

As shown in FIGS. 2 to 4, the electrode structure has a plurality of hollow portions arranged at intervals in a first direction X, and electrode portions are formed between adjacent hollow portions; the electrode structure may be a slit electrode.

In this embodiment, the hollow portion has at least a first hollow hole and a second hollow hole; projection planes of the first hollow holes in the first direction X, which are adjacent and parallel to each other in the first direction X, are completely overlapped; and projection planes of the second hollow holes in the first direction X, which are adjacent and parallel to each other in the first direction X, are completely overlapped; the electrode portion comprises at least a first electrode block and a second electrode block, where the first electrode block is located between the first hollow holes that are adjacent and parallel to each other in the first direction X, and the second electrode block is located between the second hollow holes that are adjacent and parallel to each other in the first direction X; it should be noted that the shapes of the first hollow holes, the second hollow holes, the first electrode block and the second electrode block are all parallelograms. A sum of the width of each first hollow hole and the width of the first electrode block adjacent to the first hollow hole in the first direction X is different from a sum of the width of each second hollow hole and the width of the second electrode block adjacent to the second hollow hole in the first direction X. That is, the electrode structures in this embodiment has different pixel pitches in the overall extension direction of the hollow portion (electrode portion). It should be noted that the aforementioned width is a dimension in the first direction X.

Optionally, a sum of the width of each first hollow hole and the width of the first electrode block adjacent to the first hollow hole may be 5 μm to 10 μm; a sum of the width of each second hollow hole and the width of the second electrode block adjacent to the second hollow hole may be 5 μm to 10 μm. Specifically, the width of the first hollow hole and the second hollow hole may be 4 μm to 7 μm; the width of the first electrode block and the second electrode block may be 1 μm to 3 μm.

In order to make the sum of the width of the first hollow hole and the width of the first electrode block adjacent to it in this embodiment different from the sum of the width of the second hollow hole and the width of the second electrode block adjacent to it; Including the following examples:

Embodiment One

As shown in FIG. 2, the width S11 of the first hollow hole 201 and the width S12 of the second hollow hole 202 in each hollow portion are different; the width W11 of the first electrode block 211 and the width W12 of the second electrode block 212 in each electrode portion are the same. That is to say, when designing electrode structures with different pixel pitches, the width of the electrode portions may be designed to be unchanged. By reducing the width of some positions in the hollow portion, the pixel pitch corresponding to this position is reduced, while the pixel pitches of other positions remain unchanged, thereby forming the electrode structure with different pixel pitches.

In this embodiment, by reducing the width of some positions in the hollow portion, the pixel pitch of the corresponding positions is reduced, so that on the one hand, the transverse electric field component at this position may be increased, and therefore, the deflection of the liquid crystal molecules at this position may be improved, reducing the transmittance loss of the liquid crystal display here, that is, increasing the light transmittance here, thereby increasing the light transmittance of the entire liquid crystal display. On the other hand, since the pixel pitch of only some positions is reduced, and the pixel pitch of other positions remains unchanged, there will be no large process fluctuations, which can improve the product yield.

In order to illustrate the high light transmittance of the electrode structure provided in this embodiment, this application has conducted a test through simulation software. In the test, the width S11 of the first hollow hole 201 in each hollow portion of this embodiment is selected to be 4.0 μm, and the width S12 of the second hollow hole 202 is 5.1 μm; the width W11 of the first electrode block 211 and the width W12 of the second electrode block 212 in each electrode portion are both 2.6 μm, and the simulated light transmittance is 29.53%. Compared with the comparative example 1 in Table 1, the comparative example 1 is that the width of the entire electrode strip is 2.6 μm, and the entire gap width is 5.1 μm electrode structure, and the transmittance is improved.

It should be understood that, taking the aforementioned electrode structure as the pixel electrode as an example, the structure of the liquid crystal display panel simulated in this embodiment except for the pixel electrode is the same as the structure of the liquid crystal display panel in the comparative example 1. In addition, it should be noted that the transmittance at positions with different pixel pitches will be slightly different, but no significant difference will be formed, and therefore, the display effect will not be greatly affected.

Optionally, the width of the first hollow hole 201 of one of the adjacent hollow portions is equal to the width of the second hollow hole 202 in the other; the width of the second hollow hole 202 of the one is equal to the width of the first hollow hole 201 in the other. In this way, the light transmittance is improved while ensuring the uniformity of the overall light transmittance change, so as to achieve the purpose of better display effect.

Embodiment Two

As shown in FIG. 3, the width S21 of the first hollow hole 301 and the width S22 of the second hollow hole 302 in each hollow portion are the same; the width W21 of the first electrode block 311 and the width W22 of the second electrode block 312 in each electrode portion are different. That is to say, when designing electrode structures with different pixel pitches, the width of the hollow portion may be designed to be unchanged. By reducing the width of some positions in the electrode portion, the pixel pitch corresponding to this position is reduced, while the pixel pitches of other positions remain unchanged, thereby forming electrode structures with different pixel pitches.

In this embodiment, by reducing the width of some positions in the electrode portion, the pixel pitch of the corresponding positions is reduced, so that on the one hand, the longitudinal electric field component at this position may be reduced, and therefore, the deflection of the liquid crystal molecules at this position may be improved, reducing the transmittance loss of the liquid crystal display here, that is, increasing the light transmittance here, thereby increasing the light transmittance of the entire liquid crystal display. On the other hand, since the pixel pitch of only some positions is reduced, and the pixel pitch of other positions remains unchanged, there will be no large process fluctuations, which can improve the product yield.

In order to illustrate the high light transmittance of the electrode structure provided in this embodiment, this application has conducted a test through simulation software. In the test, the width S21 of the first hollow hole 301 and the width S22 of the second hollow hole 302 in each hollow portion in this embodiment are selected as 5.1 µm; the width W21 of the first electrode block 311 in each electrode portion is 2.6 µm, and the width W22 of the second electrode block 312 is 2.6 µm, and the simulated light transmittance is 29.35%. Compared to the comparative example 1 in Table 1, the comparative example 1 is that the width of the entire electrode strip is 2.6 µm. The entire gap width is 5.1 µm electrode structure, and the transmittance is improved.

It should be understood that, taking the aforementioned electrode structure as the pixel electrode as an example, the structure of the liquid crystal display panel simulated in this embodiment except for the pixel electrode is the same as the structure of the liquid crystal display panel in the comparative example 1. In addition, it should be noted that the transmittance at positions with different pixel pitches will be slightly different, but no significant difference will be formed, and therefore, the display effect will not be greatly affected.

Optionally, the width of the first electrode block 311 in one of the adjacent electrode portions is equal to the width of the second electrode block 312 in the other; the width of the second electrode block 312 in the one is equal to the width of the first electrode block 312 in the other. In this way, the light transmittance is improved while ensuring the uniformity of the overall light transmittance change, so as to achieve a better display effect.

Example Three

As shown in FIG. 4, in each hollow portion, the width S31 of the first hollow hole 401 is greater than the width S32 of the second hollow hole 402; and in each electrode portion, the width W31 of the first electrode block 411 is greater than the width W32 of the second electrode block 5412. That is to say, when designing electrode structures with different pixel pitches, by reducing the width of some positions in the hollow portion and reducing the width of the parts corresponding to the positions of the adjacent electrode portions, the pixel pitch corresponding to this position is reduced, while the pixel pitches at other positions remain unchanged, thereby forming electrode structures with different pixel pitches. In this embodiment, by reducing the width of some positions in the hollow portion and reducing the width of the parts corresponding to the positions of the adjacent electrode portions, the pixel pitch corresponding to this position is reduced. In this way, one the one hand, the longitudinal electric field component at this position may be reduced and the transverse electric field component at this position may be increased, therefore, the deflection of the liquid crystal molecules at this position may be improved, reducing the transmittance loss of the liquid crystal display here, that is, increasing the light transmittance here, thereby improving the light transmittance of the entire liquid crystal display. On the other hand, since the pixel pitch of only some positions is reduced, and the pixel pitch of other positions remains unchanged, there will be no large process fluctuations, which can improve the product yield.

In order to illustrate the high light transmittance of the electrode structure provided in this embodiment, this application has conducted a test through simulation software. In the test, the width S31 of the first hollow hole 401 in each hollow portion in this embodiment is selected as 5.1 µm, the width S22 of the second hollow hole 402 is 4.0 µm; the width W31 of the first electrode block 411 in each electrode portion is 2.6 µm, the width W32 of the second electrode block 412 is 1.5 µm, and the simulated light transmittance is 29.54%. Compared with the comparative example 1 in Table 1, the comparative example 1 is that the width of the entire electrode strip is 2.6 µm, and the entire gap width is 5.1 µm electrode structure, and the transmittance is improved.

For example, in any of the foregoing embodiments, a plurality of the first hollow holes and the second hollow holes are provided in each hollow portion, and adjacent first hollow holes are connected by the second hollow holes, namely: the first hollow holes and the second hollow holes are arranged alternately. In other words, there may be a plurality of the first electrode blocks and the second electrodes in the electrode portion, where adjacent first electrode blocks are connected by the second electrode blocks, that is, the first electrode blocks and the second electrode blocks are arranged alternately, that is, the parts with higher light transmittance and the parts with lower light transmittance are arranged alternately, so that the parts with higher light transmittance and the parts with lower light transmittance are alternately mixed together, increasing the light transmittance, while ensuring the uniformity of the entire light transmittance change, so as to achieve the purpose of better display effect.

Optionally, in the hollow portion, the length of the first hollow hole may be equal to the length of the second hollow hole. Since the electrode portion is formed by the adjacent hollow portions, the length of the first electrode block in the electrode portion corresponding to the first hollow hole may be equal to the length of the second electrode block in the electrode portion corresponding to the second hollow hole, so as to further ensure the uniformity of the entire light transmittance change and improve the display effect. It should be understood that depending on the specific situation, the length of the first hollow hole in the hollow portion may or may not be equal to the length of the second hollow hole, and the lengths of the first electrode block and the second electrode block in the electrode portion may not be equal. It should be noted that the lengths refer to the size of the first electrode block or the second electrode block in the extension direction of itself, and the extension direction intersects the first direction.

In an embodiment, the hollow portion may be divided into two large sections. Specifically, the hollow portion may include a first hollow section and a second hollow section, and both the first hollow section and the second hollow section may include the first hollow hole and the second hollow hole, and the first hollow hole of one of the first hollow section and the second hollow section is connected with the second hollow hole of the other. The first hollow hole and the second hollow hole in the first hollow section both extend in the second direction Y; the first hollow hole and the second hollow hole in the second hollow section both extend in the third direction Z.

It should be noted that the first direction X, the second direction Y, and the third direction Z intersect in pairs. By making the second direction Y and the third direction Z intersect the first direction X, more electrode portions may be formed in a limited space to make the electric field denser, thereby increasing the light transmittance. In addition, by making the second direction Y intersect the third direction Z, that is, by making the electrode portion bendable, compared to straight electrode portion, this can form different electric field areas to improve viewing angle. Optionally, an angle between the second direction Y and the third direction Z is a right angle or an obtuse angle, which can increase the production yield of products and reduce poor image quality. Further, an angle between the second direction Y and the first direction X equals to an angle between the third direction Z and the first direction X, so as to ensure the uniformity of the entire light transmittance change and improve the display effect.

However, it is worth noting that the relationship between the first direction X, the second direction Y, and the third direction Z is not limited to the form described above, and can also be other relationships, depending on the specific circumstances, as long as to make sure that the first direction X, the second direction Y and the third direction Z intersect in pairs.

In the foregoing embodiment 1 and embodiment 2, center lines of the first hollow hole and the second hollow hole in the first hollow section extending in the second direction Y may coincide with each other; center lines of the first hollow hole and the second hollow hole in the second hollow section extending in the third direction Z coincide with each other, so that the design can improve the light transmittance while ensuring the uniformity of the entire light transmittance change, so as to achieve a better display effect.

An embodiment of the present application also provides an array substrate, which includes: a base substrate and sub-pixel units distributed on the base substrate in an array. Each of sub-pixel units include a common electrode and a pixel electrode insulated from each other, and at least one of the common electrode and the pixel electrode may be the electrode structure described in any of the foregoing embodiments.

It should be understood that the common electrode and the pixel electrode in the sub-pixel unit may be insulated from each other.

In an embodiment, the common electrode and the pixel electrode may be located in different layers, and the two are insulated by an insulating layer; further, the common electrode or the pixel electrode may be the electrode structure described in any of the foregoing embodiments, and projection of an electrode portion in the common electrode and an electrode portion in the pixel electrode in the vertical direction are arranged at an interval, and there is no overlapping area between the two.

In another embodiment, the common electrode and the pixel electrode are arranged in the same layer, and the electrode portion in the common electrode and the electrode portion in the pixel electrode are arranged at an interval.

An embodiment of the present application also provides a display device, which may be a liquid crystal display device, which includes the array substrate described in any of the foregoing embodiments. According to the embodiment of the present application, the specific type of the display device is not particularly limited, and all types of display devices commonly used in the field may be used, such as liquid crystal displays or mobile devices with liquid crystal displays, wearable devices, virtual reality (VR) or augmented reality (AR) devices, etc. Those skilled in the art can make a corresponding selection according to the specific purpose of the display device, which will not be repeated here.

The technical solution provided by this application can achieve the following beneficial effects:

In the electrode structure, the array substrate, and the display device provided by the present application, at least one of the hollow portion and the electrode portion is designed to include a portion with unequal widths, compared with the solution that the hollow portion and the electrode portion are all equal, it can ensure the process capability of the electrode structure, and also improve the light transmittance of display products using the electrode structure.

After considering the specification and practicing the invention disclosed herein, those skilled in the art will easily think of other embodiments of the present application. This application is intended to cover any variations, uses, or adaptive changes of this application. These variations, uses, or adaptive changes follow the general principles of this application and include common knowledge or customary technical means in the technical field not disclosed in this application. The description and embodiments are only regarded as exemplary, and the true scope and spirit of the application are pointed out by the appended claims.

What is claimed is:

1. An electrode structure, wherein:
   the electrode structure has a plurality of hollow portions arranged at intervals in a first direction, and electrode portions are formed between adjacent hollow portions;
   each of the hollow portions have at least a plurality of first hollow holes and a plurality of second hollow holes, and adjacent first hollow holes in each hollow portion are connected by the second hollow holes;
   projection planes of the first hollow holes in the first direction, which are adjacent and parallel to each other in the first direction, are completely overlapped, and projection planes of the second hollow holes in the first direction, which are adjacent and parallel to each other in the first direction, are completely overlapped;
   each of the electrode portions comprises at least a first electrode block and a second electrode block, wherein the first electrode block is located between the first hollow holes that are adjacent and parallel to each other in the first direction, and the second electrode block is located between the second hollow holes that are adjacent and parallel to each other in the first direction;
   a sum of a width of each first hollow hole and a width of the first electrode block adjacent to the first hollow hole in the first direction is different from a sum of a width of each second hollow hole and a width of the second electrode block adjacent to the second hollow hole in the first direction, wherein the width is a dimension in the first direction; and
   each of the first electrode block and the second electrode block has a constant width and has a quadrilateral shape.

2. The electrode structure according to claim 1, wherein:
   the width of the first hollow hole and the width of the second hollow hole in each of the hollow portions are different; and
   the width of the first electrode block and the width of the second electrode block in each of the electrode portions are the same.

3. The electrode structure according to claim 2, wherein:
the width of the first hollow hole of one of the adjacent hollow portions is equal to the width of the second hollow hole of the other of the adjacent hollow portions; the width of the second hollow hole of one of the adjacent hollow portions is equal to the width of the first hollow hole of the other of the adjacent hollow portions.

4. The electrode structure according to claim 1, wherein:
the width of the first hollow hole and the width of the second hollow hole in each of the hollow portions the same; and
the width of the first electrode block and the width of the second electrode block are different.

5. The electrode structure according to claim 4, wherein:
the width of the first electrode block of one of the adjacent electrode portions is equal to the width of the second electrode block of the other of the adjacent electrode portions; the width of the second electrode block of one of the adjacent electrode portions is equal to the width of the first electrode block of the other of the adjacent electrode portions.

6. The electrode structure according to claim 1, wherein:
in each of the hollow portions, the width of the first hollow hole is greater than the width of the second hollow hole; and
in each of the electrode portions, the width of the first electrode block is greater than the width of the second electrode block.

7. The electrode structure according to claim 1, wherein:
the hollow portions comprise a first hollow section and a second hollow section, and each of the first hollow section and the second hollow section comprises the first hollow hole and the second hollow hole;
both the first hollow hole and the second hollow hole in the first hollow section extend in a second direction;
both the first hollow hole and the second hollow hole in the second hollow section extend in a third direction; and
the first hollow hole of one of the first hollow section and the second hollow section is connected to the second hollow hole of the other of the first hollow section and the second hollow section, and the first direction, the second direction and the third direction intersect in pairs.

8. The electrode structure according to claim 7, wherein an angle between the second direction and the third direction is a right angle or an obtuse angle; and an angle between the second direction and the first direction equals to an angle between the third direction and the first direction.

9. The electrode structure according to claim 1, wherein:
a sum of the width of each first hollow hole and the width of the first electrode block adjacent to the first hollow hole and a sum of the width of each second hollow hole and the width of the second electrode block adjacent to the second hollow hole is 5 μm to 10 μm.

10. The array substrate of claim 1, wherein:
each of the first hollow hole and the second hollow hole has a constant width; and
each of the first hollow hole and the second hollow hole has a quadrilateral shape.

11. An array substrate, comprising:
a base substrate and sub-pixel units distributed on the base substrate in an array, each of the sub-pixel units comprising a common electrode and a pixel electrode insulated from each other, at least one of the common electrode and the pixel electrode is an electrode structure, wherein:
the electrode structure has a plurality of hollow portions arranged at intervals in a first direction, and electrode portions are formed between adjacent hollow portions;
each of the hollow portions have at least a plurality of first hollow holes and a plurality of second hollow holes, and adjacent first hollow holes in each hollow portion are connected by the second hollow holes;
projection planes of the first hollow holes in the first direction, which are adjacent and parallel to each other in the first direction, are completely overlapped, and projection planes of the second hollow holes in the first direction, which are adjacent and parallel to each other in the first direction, are completely overlapped;
each of the electrode portions comprises at least a first electrode block and a second electrode block, wherein the first electrode block is located between the first hollow holes that are adjacent and parallel to each other in the first direction, and the second electrode block is located between the second hollow holes that are adjacent and parallel to each other in the first direction;
a sum of a width of each first hollow hole and a width of the first electrode block adjacent to the first hollow hole in the first direction is different from a sum of a width of each second hollow hole and a width of the second electrode block adjacent to the second hollow hole in the first direction, wherein the width is a dimension in the first direction; and
each of the first electrode block and the second electrode block has a constant width and has a quadrilateral shape.

12. The array substrate of claim 11, wherein the array substrate is implemented in a display device.

13. A method, comprising:
providing an electrode structure, wherein:
the electrode structure has a plurality of hollow portions arranged at intervals in a first direction, and electrode portions are formed between adjacent hollow portions;
each of the hollow portions have at least a plurality of first hollow holes and a plurality of second hollow holes, and adjacent first hollow holes in each hollow portion are connected by the second hollow holes;
projection planes of the first hollow holes in the first direction, which are adjacent and parallel to each other in the first direction, are completely overlapped, and projection planes of the second hollow holes in the first direction, which are adjacent and parallel to each other in the first direction, are completely overlapped;
each of the electrode portions comprises at least a first electrode block and a second electrode block, wherein the first electrode block is located between the first hollow holes that are adjacent and parallel to each other in the first direction, and the second electrode block is located between the second hollow holes that are adjacent and parallel to each other in the first direction;
a sum of a width of each first hollow hole and a width of the first electrode block adjacent to the first hollow hole in the first direction is different from a sum of a width of each second hollow hole and a width of the second electrode block adjacent to the second hollow hole in the first direction, wherein the width is a dimension in the first direction; and each of the first electrode block and the second electrode block has a constant width and has a quadrilateral shape.

\* \* \* \* \*